July 31, 1934. H. G. RICE 1,968,264
COMBINED BOTTLE CAPPER AND FRUIT PRESS
Filed Oct. 3, 1931
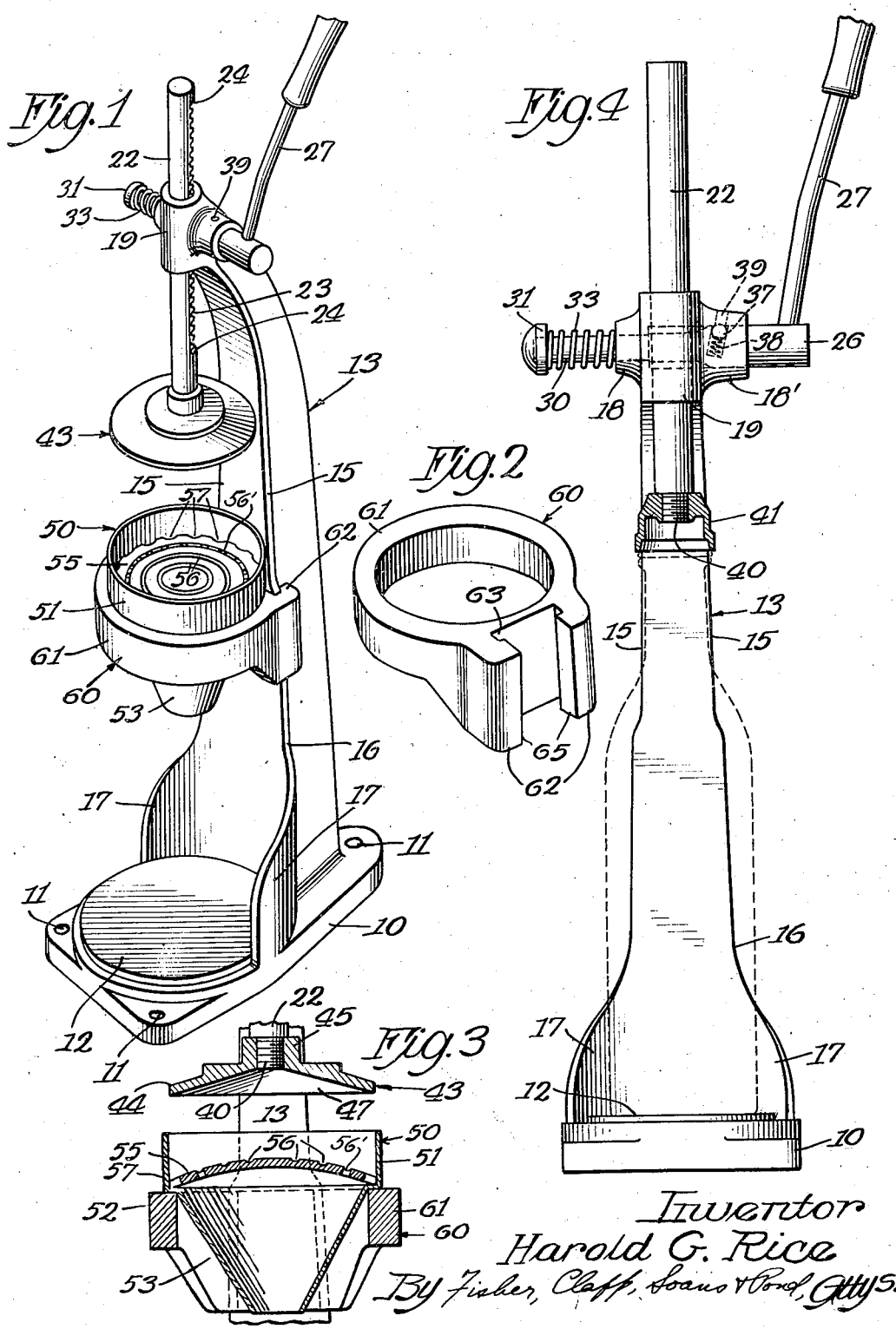
Inventor
Harold G. Rice Patented July 31, 1934

1,968,264

UNITED STATES PATENT OFFICE 1,968,264

COMBINED BOTTLE CAPPER AND FRUIT PRESS

Harold G. Rice, Chicago, Ill., assignor, by mesne assignments, to Indestro Manufacturing Corp., Chicago, Ill., a corporation of Illinois Application October 3, 1931, Serial No. 566,696

2 Claims. (Cl. 100—42)

My invention has as an object the provision of a device which is especially useful in the preparation of fruit juices and beverages and is particularly adapted for home use, inasmuch as it performs the functions of two machines and thus effects an economy of space. The device contemplated by my invention is especially adaptable for use in the preparation of fruit beverages, since it presents in combined form apparatus for expressing the juice from fruit and for bottling the juice.

A further object is to provide such a device which is simple in construction, inexpensive to fabricate, strong, durable, efficient, and in every way satisfactory for the purposes indicated.

Various other objects and advantages will become apparent as the description proceeds.

Referring now to the drawing, Fig. 1 represents a perspective view of a preferred embodiment of my invention, when it is being used as a press.

Fig. 2 is a perspective view of a stage or platform serving as an accessory when the device is being used as a press.

Fig. 3 is a fragmentary vertical sectional view through the parts functioning as a press, and Fig. 4 is a front elevational view of the device, when operating as a bottle capper.

The improved device comprises a base portion 10 which is preferably perforated as indicated at 11 for the passage of screws or like means for securing the device to a table or bench. The base is preferably provided with a removable and replaceable rubber mat 12.

Secured to and preferably cast integrally with the base 10 is an upright or standard 13 which in sectional configuration is substantially T-shaped and rises substantially vertically for the major portion of its length and then curves forwardly adjacent its upper portion, as shown clearly in Figure 1. Flanges 15 forming the cross portion of the T are longitudinally tapered, as clearly shown in Figures 1 and 2, expanding downwardly at a substantially uniform rate for the major portion of its length, the lower portion thereof expanding abruptly as at 16 to provide ears 17 which curve in conformity with the base. These ears 17 serve as a seat to retain a bottle on the base when the device is being used as a bottle capper.

The standard 13 adjacent its upper extremity is, in my preferred embodiment, preferably provided with a horizontal sleeve 18, 18', preferably integral with the standard, and also a substantially vertical sleeve 19 communicating therewith. Slidably mounted in the sleeve 19 is a plunger 22, the rear face of which is provided with a plurality of teeth 23 constituting a rack, and adjacent the upper and lower extremities of the rack shoulders 24 extend beyond the outer edges of the teeth 23 so as to provide stops for limiting the vertical displacement of the plunger.

Rotatably and slidably mounted in the sleeve 18, 18' is a shaft 26 having secured thereto a radially extending operating handle 27. Formed on the shaft 26 is a plurality of teeth (not shown) constituting a pinion co-operating with the rack teeth 23. Adjacent the pinion teeth the shaft 26 is of reduced diameter as shown at 30, the outer extremity of this reduced portion being threaded to engage a nut 31 or the like. A helical compression spring 33 is coiled around the reduced portion of the shaft between the nut 31 and the peripheral edge of the sleeve 18 so as normally to urge the shaft 26 toward the left (Figure 4) and the pinion teeth (not shown) into engagement with the rack teeth 23. It will be noted that the sleeve 18 is of such a size as to fit the reduced portion 30 of the shaft 26 while the extension 18' of the sleeve 18 is larger than the latter, so as to journal the larger portion of the shaft 26.

The above described mechanism permits longitudinal adjustment of the plunger 22 by shifting the shaft 26 to the right so as to displace the pinion from the rack, as is fully described in my Patent No. 1,813,954, granted July 14, 1931.

The device may be provided with mechanism for retaining the handle in elevated position, as described and claimed in my co-pending application No. 560,572, filed September 1, 1931. This mechanism comprises a ball 37 outwardly urged by a coil spring 38, both being seated in a radial cavity in the shaft 26 so that the ball may engage a perforation 39 in the sleeve 18'.

The lower portion of the plunger 22 is threaded as at 40. When the device is to be used as a bottle capper, a capping head 41, as shown in Figure 4, which is provided with an axial perforation having female threads, is screwed onto the threaded portion 40 of the plunger. The device then functions in the usual manner as a bottle capper.

When the device is to be used as a press, in lieu of the capping head 41, there is secured to the plunger a compressing member 43, as shown in Figures 1 and 3. This compressing member comprises a plate 44 having a central cylindrical boss 45 preferably integral therewith, this boss having female threads for engaging the threaded extremity 40 of the plunger 22. The plate 44 is preferably concave on its under surface as indicated at 47 in Figure 3.

Co-operating with the compressing member 43 is a funnel-like member 50 for supporting fruit or like material to be pressed, this member having a substantially cylindrical wall portion 51, which is slightly larger in inside diameter than the outside diameter of the compressing member 43, so that the compressing member may move freely therein. A substantially horizontal annular shoulder 52 is formed at the bottom of the wall portion 51, and a frusto-conical portion 53 joins the shoulder 52. A sieve member 55 formed of relatively stiff material, such as a plate of metal or the like, is loosely disposed within the chamber formed by the wall 51, its peripheral edge resting upon the inside of the shoulder 52. This plate is substantially circular and is curved upwardly so as to co-operate with the concave face of the compressing member 43. This plate is provided with circular grooves 56 and perforations 56' and its peripheral edge is also cut out to form semi-circular perforations 57.

The funnel-like member 50 is supported by means of a stage or platform 60 (shown in detail in Figure 2), comprising a ring 61 with which is preferably formed integrally a bracket comprising vertically elongated ears 62 defining a vertical slot 63 between the ears and the ring. The opposed edges 65 of the ears 62 are spaced apart sufficiently to permit of the ears being slipped over the flanges 15 of the pedestal 13 adjacent the upper portion thereof whereby, upon moving the platform downwardly, the flanges 15 may become wedgingly engaged in the slots 63.

It is believed that the operation of the device will be readily apparent from the above description. When the device is to be used as a fruit press, the platform 60 will be arranged on the pedestal in the manner just described and the funnel-like member 50 seated thereon with its shoulder 52 resting upon the ring 61 of the platform and the plate 55 disposed within the funnel-like member, as shown. The compressing member 43 will be screwed upon the plunger 22 and the device is then ready to operate as a press upon the fruit or other material disposed over the plate 55. Obviously, a receptacle may be disposed on the base for receiving the expressed juice.

When it is desired to use the device as a bottle capper, the compressing member 43 is removed from the plunger and the capping head 41 substituted therefor, and the platform 60 and funnel-like member are removed from the pedestal by raising the platform upwardly and then outwardly from engagement with the flanges 15 of the pedestal.

It will be seen that I have provided a combination implement which is especially adapted to perform two closely related operations in the preparation of fruit juices, fruit beverages, and the like with only a slight adjustment.

Various changes and modifications coming within the spirit of my invention will doubtless occur to those skilled in the art. Hence, I do not wish to be limited to the specific form disclosed or uses mentioned except as set forth in the appended claims, which are to be interpreted as broadly as the state of the art will permit.

I claim as my invention:

1. In a device of the class described, a base member, a pedestal having a pair of lateral flanges, said flanges expanding downwardly, a detachable member wedgingly engageable with said flanges, said member being adapted to support material to be pressed, a reciprocable member carried by said pedestal, means for manually operating the latter, and a compressing member carried by said reciprocable member.

2. In a device of the class described, a base member, a pedestal having a pair of lateral downwardly-expanding flanges, a platform having a pair of oppositely disposed rearwardly extending ears defining a substantially vertical groove, said ears and groove co-operating with the flanges of said pedestal whereby said platform is wedgingly and detachably secured to said pedestal, a reciprocable member carried by said pedestal, and an expressing member secured to said reciprocable member and co-operating with said platform.

HAROLD G. RICE.